Patented May 18, 1943

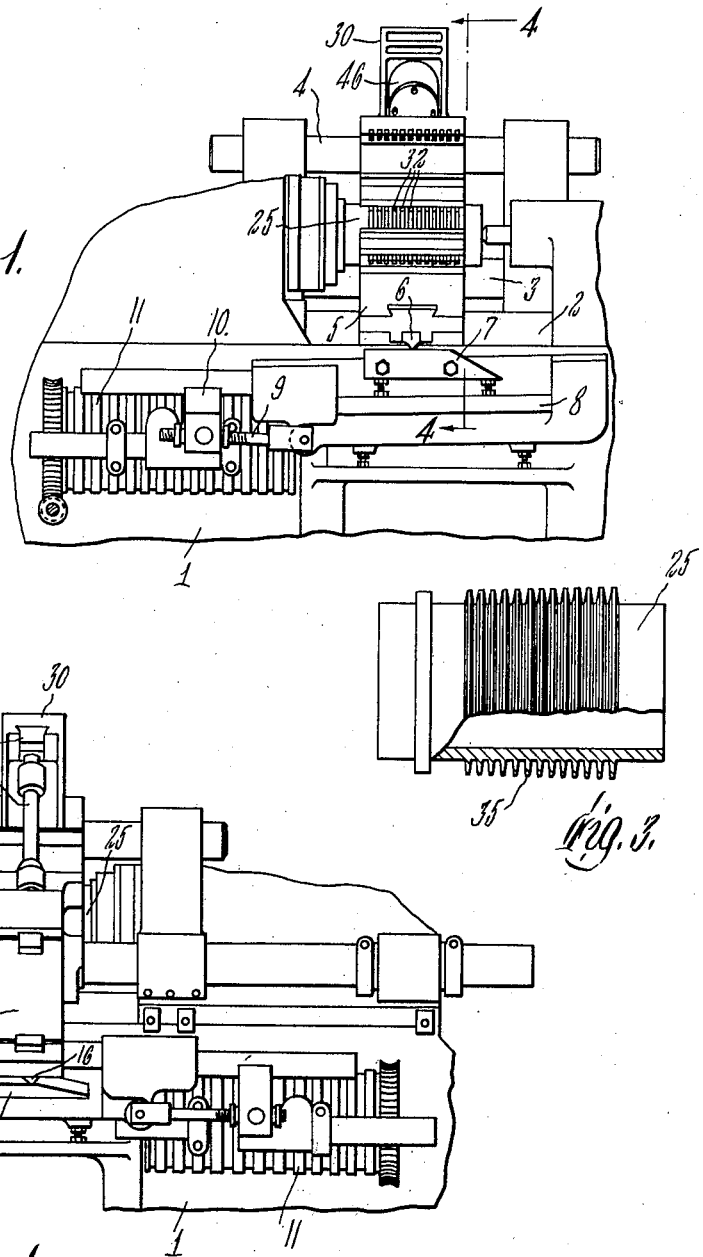

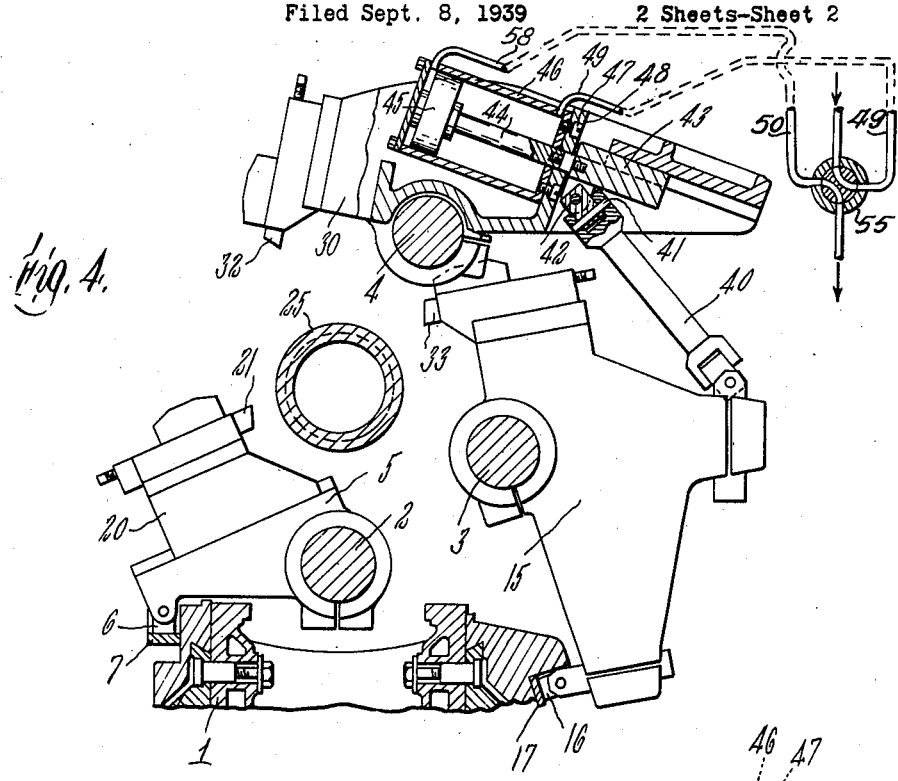
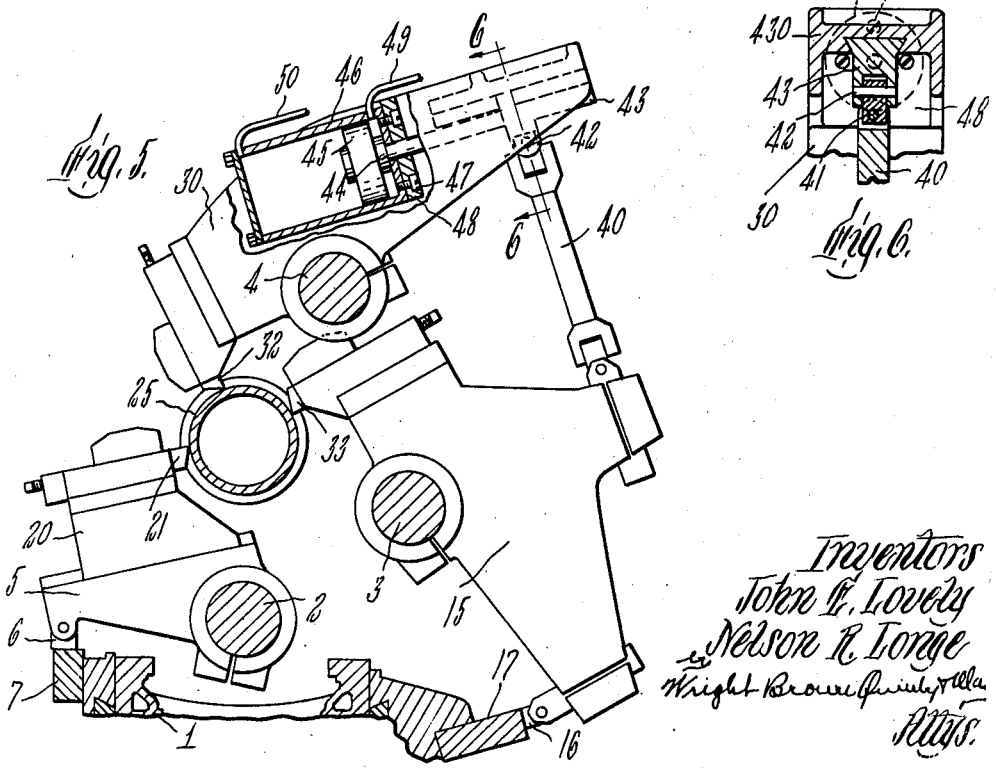
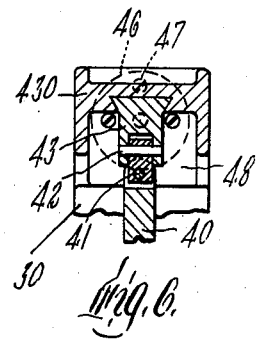

2,319,741

UNITED STATES PATENT OFFICE 2,319,741

TOOL CARRIER CONTROL MECHANISM

John E. Lovely and Nelson R. Longe, Springfield, Vt., assignors to Jones & Lamson Machine Company, Springfield, Vt., a corporation of Vermont Application September 8, 1939, Serial No. 293,874

11 Claims. (Cl. 82—2)

This invention relates to control mechanism for a tool carrier of a lathe and is especially adapted for a lathe of the well known Fay type.

It has for an object to provide for a motion of such a tool carrier into and out of operative position of sufficient extent to permit easy removal and replacement of the work when the carrier is retracted.

For purpose of illustration, the invention is shown herein and will be further described in connection with a lathe such as is illustrated in the Lovely Patent No. 1,865,527, granted July 5, 1932. In that patent pivotally mounted tool carriers are shown as carried by the front, back and top tool bars, each carrier supporting tools and all cooperating to cut the fins in a forged air craft engine cylinder, the carrier on the top bar being rocked through a connection to the carrier on the back tool bar.

In accordance with the present invention, this connection is so modified as to substantially increase the extent of retraction of the top tool carrier so as to facilitate the loading and unloading of the work.

For a more complete understanding of this invention, reference may be had to the accompanying drawings, in which Figures 1 and 2 are fragmentary front and rear elevations, respectively, of a lathe embodying the invention.

Figure 3 is a view partly in elevation and partly in section of an air craft engine cylinder showing the fins cut by the machine of Figures 1 and 2.

Figure 4 is a section to a larger scale on line 4—4 of Figure 1 and showing the tool carriers retracted.

Figure 5 is a view similar to Figure 4, but showing the tool carriers advanced with the tools in final operating positions.

Figure 6 is a detail section on line 6—6 of Figure 5.

Referring to the accompanying drawings, Figures 1, 2, 4, and 5, a Fay lathe is shown having a bed 1 and bottom, back, and top tool bars 2, 3 and 4, respectively. The bottom tool bar 2 is shown as supporting a tool carrier 5, the outer end of which carries a shoe 6 slidable on a former cam 7. As shown, this former cam is provided with a top cam surface and it is carried by a slide 8 connected through a link 9 to a cam follower carrier 10 actuated by cams (not shown) on a cam drum 11. Commonly the carrier 5 is clamped to the bottom bar 2, and when desired the bottom bar may be moved axially. When employed in finning engine cylinders, however, axial motion is not required.

The back bar 3 may have secured thereon a tool carrier 15 and its rear end may be provided with a shoe 16 (see Figures 2, 4 and 5) for engagement with a top cam face of a former cam 17. This former cam may be moved axially by suitable cams (not shown) on the cam drum 11, all in the well known manner and as set forth in the Lovely Patent No. 1,865,527, to which reference has already been made, and it may have an axial motion of small amplitude, as shown in the patent.

The carrier 5 supports a slide 20 on which are adjustably secured a gang of tools 21, the machine as shown being set up for cutting the fins in an aircraft engine cylinder, this cylinder being mounted for rotation on a suitable work spindle (not shown), the work being indicated at 25 in Figures 3, 4 and 5.

The top tool bar 4 supports a third tool carrier 30 which is shown as clamped to the bar 4 and intended in normal action to have tilting motion and a slight axial motion. The forward end of this tool carrier 30 carries the tools 32. The back tool carrier 15 also carries tools 33 at its upper end and when all the carriers are in operating position, their tools engage the work at angularly spaced points as shown in Figure 5.

Referring to Figure 3, the particular work shown is a forged air craft engine cylinder in which it is desired to cut the air cooling fins 35 which are shown as tapered toward their free extremities but spaced closely along the length of a portion of the cylinder. The gang of tools 21 may be formed to cut inwardly between the several fins forming straight sided cuts, while the tools 32 and 33 may be formed to finish the sides of the fins to tapered form, as shown, this being the arrangement shown in the Lovely Patent No. 1,865,527.

As shown, also, in this patent, the rocking of the tool carrier 30 is produced by the rocking of the tool carrier 15, this being accomplished through a link 40 which is pivotally connected at its lower end to the carrier 15 and has a pivotal connection at its upper end to the carrier 30. In the patented construction, however, the pivotal connection to the top tool carrier of the link 40 is at an adjustably fixed point so that the extent of rocking motion of the top carrier is controlled by the extent of rocking of the back tool carrier as determined by the fixed pivotal centers of their connecting link, the adjustability being provided in order to fix the relative positions of the rocking tool carriers as desired in the set-up of the machine.

In the present case, an additional extent of rocking motion is provided for the top tool carrier in order that when it is retracted it may be swung back from the work considerably further than in the construction shown in the Lovely patent, in order to separate the tools 32 more widely from the work, thus to facilitate the removal of finished work and the insertion of new work, but without disturbing the adjustment of the angular position of the carriers while they are operating on the work. To this end, the upper end of the link 40, as shown herein, is pivoted through the angularly related pivot pins 41 and 42 to a slide 43. This slide has a dovetail connection, as shown best in Figure 6, with one end portion 430 of the top tool carrier 30 at one side of its fulcrum about the axis of the shaft 4 and it is arranged to slide substantially lengthwise of this carrier. The pivot 41 and a similar pivot at the lower end of the link permits the slight relative axial motions of the back and top tool carriers to cause these tools to cut the tapering sides of the work fins. The lower pivot may be carried by a piece adjustably secured to the lower carrier 15 in the same manner and for the same purpose as the adjustable connection through the piece 70 shown in the Lovely Patent No. 1,865,527 at the upper tool carrier. The slide 43 is shown as secured to the outer end of a piston rod 44 attached to a piston 45 slidable within a fluid pressure cylinder 46, which may be secured as by the screws 47 to the forward face of a partition 48 extending laterally of the top tool carrier. Suitable pipe connections 49 and 50 permit fluid under pressure to be delivered to either selected face of the piston 45, the other being open to discharge at the same time, so that the slide 43 may be moved between the position shown in Figure 4 and the position shown in Figure 5. In the position shown in Figure 5, the link 40 is substantially perpendicular to the direction of sliding motion of the slide 43 which is then at its outer limit of motion. The parts are shown in this figure with the tools 21, 32 and 33 at substantially their full depth of cut. The finning operation being completed, the carriers 5 and 15 are rocked in retracted direction, the rocking of the carrier 15 acting through the link 40 to retract the tools 32, but a further retraction motion is given these tools by allowing fluid under pressure to come in behind the piston 45, thus forcing this piston 45 forwardly into the position shown in Figure 4. This acts to move the slide 43 forwardly and acts to shorten the effective lever arm of the link 40, which thus gives an upward motion to the tools 32 in retracting direction to an extent further than it would have moved had the link 40 remained with its upper end pivotally connected to the top tool carrier adjacent to its rear end in the position shown in Figure 5. The long effective lever arm for the top tool carrier when the tools are in cutting position is desirable for maintaining high accuracy of tool position during operation.

Fluid under pressure may be admitted to and discharged from the cylinder 46 by a suitable valve 55 located at any point convenient to the operator, so that when he is ready to start a finning operation on a new piece of work, the slide 43 may be moved quickly to its outward position, whereupon as the rear tool bar is rocked to operative position, the top tool bar will likewise be so rocked, while after the finning operation has been completed, and the tool carriers 5 and 15 are retracted, the top tool carrier 30 may be further retracted quickly to facilitate removal of the finished work and the insertion of a new piece.

From the foregoing description of an embodiment of this invention, it should be evident to those skilled in the art that various changes and modifications might be made without departing from the spirit or scope of the invention as defined by the appended claims.

We claim:

1. A machine of the class described, comprising a rockably mounted tool carrier, means engaging said carrier actuable to rock said carrier, other means actuable during the operative cycle of the machine between the insertion and removal of the work to vary the distance from the rocking axis of said tool carrier at which said carrier rocking means is effective on said carrier, and means for controlling said varying means.

2. A machine of the class described, comprising a rockably mounted tool carrier, means engaging said carrier actuable to rock said carrier, and other means actuable during the operative cycle of the machine between the insertion and removal of the work to vary the distance from the rocking axis of said tool carrier at which said carrier rocking means is effective on said carrier, said distance being greatest during operation of tools carried by said carrier.

3. A machine of the class described, comprising a rockably mounted tool carrier, means for rocking said carrier comprising a link having a connection to said carrier at one side of the fulcrum thereof, and means for pushing and pulling on said link, said connection including a pivot and a part movable on said carrier transverse to said link, means actuable during the operating cycle of the machine between the insertion and removal of work for moving said part, and means for controlling said moving means.

4. A machine of the class described, comprising a rockably mounted tool carrier, means for rocking said carrier comprising a link having a connection to said carrier at one side of the fulcrum thereof, and means for pushing and pulling on said link, said connection including a pivot and a part movable lengthwise of said carrier and transverse to said link, means actuable during the operating cycle of the machine between the insertion and removal of work for moving said part, and means for controlling said moving means.

5. In a machine of the closs described, a tool carrier, a pivotal mounting for said carrier between its ends, a tool carried by said carrier at one side of the fulcrum of said carrier, a slide movably supported by said carrier on the other side of said fulcrum, a link pivoted to said slide, means pulling and pushing on said link for rocking said carrier about said fulcrum, and means for moving said slide on said carrier to impart an additional rocking motion to said carrier actuable during the operating cycle of the machine between the insertion and removal of work.

6. In a Fay lathe having a work spindle, back and top tool bars, tool carriers fulcrumed about the axes of said bars, means for rocking the carrier for said back bar, and a link pivotally connecting said tool carriers, a member movably carried by the carrier fulcrumed on the axis of said top tool bar and containing the pivotal connection for said link, and means for moving said member relative to its carrier actuable during the operating cycle of the machine between the insertion and removal of work.

7. In a Fay lathe having a work spindle, back and top tool bars, tool carriers fulcrumed about the axes of said bars, means for rocking the carrier for said back bar, and a link pivotally connecting said tool carriers, a slide member carried by the carrier fulcrumed on the axis of said top tool bar and containing the pivot connection for said link, and fluid pressure means acting to move said slide relative to its carrier.

8. A machine of the class described, comprising a rockably mounted tool carrier, means for rocking said carrier comprising a link having a pivotal connection to said carrier at one side of the fulcrum thereof, means for pushing and pulling on said link, said pivotal connection including a part movable on said carrier transverse to said link, and means independent of said link pushing and pulling means for moving said part actuable during the operating cycle of the machine between the insertion and removal of work.

9. A machine of the class described, comprising a rockably mounted tool carrier, means for rocking said carrier comprising a link having a pivotal connection to said carrier at one side of the fulcrum thereof, means for pushing and pulling on said link, said pivotal connection including a part movable lengthwise of said carrier and transverse to said link, and means independent of said link pushing and pulling means for moving said part actuable during the operating cycle of the machine between the insertion and removal of work.

10. A machine of the class described, comprising a rockably mounted tool carrier, a lever, operating connections between said lever and tool carrier causing rocking of said lever to rock said carrier, and means for rocking said lever, said connections including means movable to rock said tool carrier during a machine cycle between the placing and removal of work independently of the rocking of said lever, means actuable to move said movable means, and means for controlling said moving means.

11. A machine of the class described, comprising a rockably mounted tool carrier, means for rocking said carrier comprising a link having a connection to said carrier at one side of the fulcrum thereof, means for pushing and pulling on said link, said pivotal connection including a pivot for said link and a part carrying said pivot movable lengthwise of said carrier and transverse to said link, and means actuable to move said part quickly from and toward a limiting position in which said tool carrier may be given a working position by said pushing and pulling means.

JOHN E. LOVELY.
NELSON R. LONGE.